United States Patent
Courousse (10) Patent No.: US 11,442,738 B2
(45) Date of Patent: Sep. 13, 2022

(54) METHOD FOR EXECUTING A MACHINE CODE OF A SECURE FUNCTION

(71) Applicant: COMMISSARIAT A L'ENERGIE ATOMIQUE ET AUX ENERGIES ALTERNATIVES, Paris (FR)

(72) Inventor: Damien Courousse, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 275 days.

(21) Appl. No.: 16/643,906

(22) PCT Filed: Sep. 14, 2018

(86) PCT No.: PCT/FR2018/052263
§ 371 (c)(1),
(2) Date: Mar. 3, 2020

(87) PCT Pub. No.: WO2019/058047
PCT Pub. Date: Mar. 28, 2019

(65) Prior Publication Data
US 2020/0272475 A1 Aug. 27, 2020

(30) Foreign Application Priority Data
Sep. 22, 2017 (FR) .................................. 17 58799

(51) Int. Cl.
*G06F 9/38* (2018.01)
*G06F 9/30* (2018.01)
(Continued)

(52) U.S. Cl.
CPC ........ *G06F 9/3842* (2013.01); *G06F 9/30145* (2013.01); *G06F 21/12* (2013.01);
(Continued)

(58) Field of Classification Search
None
See application file for complete search history.

(56) References Cited

U.S. PATENT DOCUMENTS 4,558,176 A * 12/1985 Arnold .................... G06F 21/72
705/51
10,354,064 B2 * 7/2019 Guilley ................... G06F 21/54
(Continued)

FOREIGN PATENT DOCUMENTS

CA 2 327 037 A1 5/2002
EP 2 958 044 A1 12/2015
(Continued)

OTHER PUBLICATIONS

'Homomorphic Encryption: from Private-Key to Public-Key' by Ron Rothblum, 2010. (Year: 2010).*
(Continued)

*Primary Examiner* — Steven G Snyder
(74) *Attorney, Agent, or Firm* — Oblon, McClelland, Maier & Neustadt, L.L.P.

(57) ABSTRACT

An execution method comprises the following operations:
—every time an instruction to be protected of a preceding basic block is loaded, constructing a new value of a signature of this preceding basic block from the value of this instruction to be protected and the preceding value of the signature. The method further includes loading an initialization vector contained in a subsequent basic block and calculating, from said loaded initialization vector, a value reached for signing the preceding basic block. The method also includes comparing the constructed value of the signature with the expected value of this signature, and—only if these values do not match, triggering the signaling of a fault during the execution of the machine code.

10 Claims, 1 Drawing Sheet

(51) Int. Cl.
  *H04L 9/00* (2022.01)
  *H04L 9/08* (2006.01)
  *G06F 21/12* (2013.01)

(52) U.S. Cl.
  CPC ............ *H04L 9/008* (2013.01); *H04L 9/0825* (2013.01); *G06F 2221/0704* (2013.01)

(56) References Cited

U.S. PATENT DOCUMENTS

| | | | | |
|---|---|---|---|---|
| 10,771,500 | B2* | 9/2020 | Khalimonenko | H04L 63/1416 |
| 10,942,868 | B2* | 3/2021 | Savry | G06F 9/24 |
| 11,153,080 | B1* | 10/2021 | Nix | H04L 9/0852 |
| 11,157,659 | B2* | 10/2021 | Courousse | G06F 21/556 |
| 2009/0328211 | A1* | 12/2009 | Abraham | G06F 21/54 726/22 |
| 2013/0129079 | A1* | 5/2013 | Swaminathan | H04L 9/0637 380/28 |
| 2017/0124322 | A1* | 5/2017 | Guilley | G06F 21/566 |
| 2019/0020680 | A1* | 1/2019 | Khalimonenko | H04L 67/025 |
| 2019/0095354 | A1* | 3/2019 | Savry | G06F 21/72 |
| 2020/0089919 | A1* | 3/2020 | Courousse | G06F 21/755 |
| 2020/0257805 | A1* | 8/2020 | Courousse | G06F 9/3005 |
| 2020/0302067 | A1* | 9/2020 | Savry | G06F 21/602 |
| 2020/0302068 | A1* | 9/2020 | Savry | G06F 21/602 |
| 2020/0349294 | A1* | 11/2020 | Savry | H04L 9/06 |

FOREIGN PATENT DOCUMENTS

| | | | | |
|---|---|---|---|---|
| EP | 3457621 | A1 * | 3/2019 | .......... G06F 11/1004 |
| EP | 3457620 | B1 * | 1/2020 | .......... G06F 11/1405 |
| EP | 3712794 | A1 * | 9/2020 | ............ G06F 21/54 |
| EP | 3712795 | A1 * | 9/2020 | ............ G06F 21/54 |
| FR | 2 985 337 | A1 | 7/2013 | |
| WO | WO-2018189443 | A1 * | 10/2018 | ............ G06F 21/12 |

OTHER PUBLICATIONS

'Control-Flow Checking by Software Signatures' by Oh et al. IEEE Transactions on Reliability, vol. 51, No. 2, Mar. 2002. (Year: 2002).*
International Search Report dated Oct. 26, 2018 in PCT/FR2018/052263 filed Sep. 14, 2018, 3 pages.
de Clercq et al., "SOFIA: Software and Control Flow Integrity Architecture," 2016, 6 pages total.
Danger et al., "HCODE: Hardware-Enhanced Real-Time CFI," 2014, 11 pages total.

* cited by examiner

METHOD FOR EXECUTING A MACHINE CODE OF A SECURE FUNCTION

The invention relates to a method for the execution of a machine code of a secure function by a microprocessor and a binary code comprising the machine code of this secure function. The invention also relates to:

an information storage medium and a device for implementing this execution method, and a compiler for generating this binary code.

To obtain information on a binary code or provoke an unexpected operation of the binary code, it is known practice to subject it to attacks known by the term "fault attack". These attacks consist in disrupting the operation of the microprocessor upon the execution of the machine code by various physical means such as modifications of the power supply voltages, modifications of the clock signal, exposure of the microprocessor to electromagnetic waves, and the like.

Using such disruptions, a hacker can corrupt the integrity of the machine instructions or of the data to, for example, retrieve a secret key of a cryptographic system, circumvent security mechanisms such as the verification of a pin code upon an authentication or simply prevent the execution of an essential function for the security of a critical system.

An attack by fault injection can provoke:

a transient or permanent alteration of the content of the memory and therefore of the data or of the code of the program, or an alteration of the operation of the microprocessor, for example, by modifications of the values of the data registers, of the instructions currently being executed by the arithmetic and logic unit, of the operation of the arithmetic and logic unit, of the status and control registers, or the like.

Depending on the nature of the fault, three types of alterations can be considered which will have an effect on the program executed:

1) an alteration of the instructions of the machine code executed such as an alteration of the memory or an alteration of the state of the processor at the time of the processing of the faulty instruction, 2) an alteration of the values stored in variables or registers, and 3) an alteration of the machine code control flow, for example, by modification of the program memory or by modification of the ordinal counter or by modification of the status registers in the case of a conditional branch.

The control flow corresponds to the execution path followed upon the execution of the machine code. The control flow is conventionally represented in the form of an oriented graph known as "control flow graph".

When the alteration prevents only the execution of one or more of the instructions of the machine code or when the alteration has an effect on the processor that is equivalent to not executing the disrupted instruction, this is then called an instruction jump. When the alteration replaces one or more of the instructions of the machine code with other instructions that are executable by the microprocessor, this is then called an instruction replacement.

When the alteration modifies a branch instruction or when the alteration consists in skipping a branch instruction, an effect of circumvention of the control flow is observed. The control flow circumvention effect can be observed when a branch instruction is altered or when the condition involved in a conditional branch is modified or when the return address of a function is modified or even when the ordinal counter of the microprocessor is modified.

The machine code of a function can be instrumented to allow the detection and the signaling of the faults provoked by the fault injection. When the machine code of a function is thus instrumented, this machine code is qualified as "machine code of a secure function". Indeed, contrary to the machine code of a non-secure function, this machine code is capable of allowing the signaling of the faults typically encountered in cases of attack by fault injection.

For example, known methods for execution of a machine code of a secure function by a microprocessor comprises:

a) the supply of the machine code stored in a main memory, this machine code being formed by a succession of basic blocks in which:

each basic block comprises a succession of instructions systematically executed one after the other upon the execution of the machine code by the microprocessor, among these instructions, at least some of them being instructions to be protected, each basic block begins at a branch address and ends with a branch instruction to a branch address of another basic block, the basic block which begins at the branch address being called next basic block and the basic block which ends with a branch instruction to this branch address being called preceding basic block, b) upon the execution of the machine code by the microprocessor, the method comprises the following operations:

1) the microprocessor loads then decodes the instructions of the preceding and next basic blocks of the machine code, then each decoded instruction is executed by an arithmetic and logic unit of the microprocessor, 2) each time an instruction to be protected of the preceding basic block is loaded, a hardware securing module of the microprocessor constructs, by applying a preprogrammed function $F_{cs}(\ )$, a new value of a signature from the value of this instruction to be protected and from the preceding value of the signature, this signature being thus a function of the values of the different instructions to be protected of the preceding basic block, 3) the microprocessor loads an initialization vector contained in the machine code and the hardware securing module calculates, from this loaded initialization vector and by applying a preprogrammed function $F_{IVS}(\ )$, an expected value for the signature of the preceding basic block, 4) in response to the loading of a predetermined instruction, the hardware securing module compares the constructed value of the signature to the expected value of this signature calculated from the loaded initialization vector, and 5) only if these values do not correspond, the hardware securing module triggers the signaling of a fault upon the execution of this machine code and, otherwise, inhibits such signaling.

For example, such an execution method is described in the following article: Ruan de Clercq et AL: "*SOFIA: Software and Control Flow Integrity Architecture*", Elsevier, Computers & Security, volume 68, July 2017, pages 16-35.

This known method is interesting because it makes it possible both to control the integrity of the basic blocks and of the control flow. To control the integrity of the basic blocks, each basic block begins with instructions which define the expected value of the signature of this basic block. Then, upon the execution of the instructions to be protected of this basic block, a value is constructed, from the instructions executed, for the signature of this basic block. If the constructed value of the signature corresponds to the expected value, then the integrity of the basic block is confirmed.

To control the integrity of the control flow, the known method proposes encrypting each instruction to be protected of the basic block with a value that is a function of the current value of the ordinal counter and its preceding value. Thus, if the control flow is modified, the preceding or current value of the ordinal counter does not correspond to the expected value and the correct decryption of the instructions to be protected becomes impossible.

Prior art is also known:
US2017/124322A1,
CA2327037A1, and
FR2985337A1.

The method described in US2017/124322A1 does not make it possible to control the integrity of the instructions of the basic blocks.

The invention aims to control both the integrity of the basic blocks and the integrity of the control stream but in a way that is simpler than in the known methods. The object of it is therefore such an execution method according to claim 1.

The embodiments of this execution method can comprise one or more of the features of the dependent claims.

Another subject of the invention is a binary code comprising a machine code of a secure function for the implementation of the method claimed.

Another subject of the invention is a microprocessor-readable information storage medium, this information storage medium containing the binary code claimed.

Another subject of the invention is an electronic device for implementing the method claimed.

Finally, another subject of the invention is a compiler capable of automatically converting a source code of a program containing a secure function into a binary code comprising a machine code of a secure function, in which the compiler is capable of automatically converting the source code into a binary code claimed.

The invention will be better understood on reading the following description, given purely as a nonlimiting example and with reference to the drawings in which.

NOTATIONS AND DEFINITIONS

In these figures, the same references are used to denote the same elements. Hereinafter in this description, the features and functions well known to the person skilled in the art are not described in detail.

In this description, the following definitions are adopted.

A "program" denotes a set of one or more predetermined functions that are to be executed by a microprocessor.

A "source code" is a representation of the program in a computer language, that is not directly executable by a microprocessor and that is intended to be converted by a compiler into a machine code that is directly executable by the microprocessor.

A program or a code is said to be "directly executable" when it is capable of being executed by a microprocessor without this microprocessor needing to first compile it by means of a compiler or interpret it by means of an interpreter.

An "instruction" denotes a machine instruction that is executable by a microprocessor. Such an instruction is composed:
of an opcode, or operation code, coding the nature of the operation to be executed, and
of one or more operands defining the value or values of the parameters of this operation.

The "value of an instruction" is a numeric value obtained, using a bijective function, from the succession of "0" and "1" which codes, in machine language, this instruction. This bijective function can be the identity function.

A "machine code" is a set of machine instructions. It is typically a file containing a succession of bits with the value "0" or "1", these bits coding the instructions to be executed by the microprocessor. The machine code is directly executable by the microprocessor, that is to say without requiring a prior compilation or interpretation.

A "binary code" is a file containing a succession of bits bearing the value "0" or "1". These bits code data and instructions to be executed by the microprocessor. Thus, the binary code comprises at least a machine code and, in addition, generally, digital data processed by this machine code.

A "instruction flow" is a succession of instructions ranked one after the other and which forms, in the machine code, an ordered series of bits. The instruction flow begins with an initial instruction and ends with a final instruction. With respect to a given instruction of the instruction flow, the instructions situated on the side of the initial instruction are called "preceding instructions" and the instructions situated on the side of the final instruction are called "subsequent instructions". In this text, this instruction flow in memory is subdivided into a succession of basic blocks that are immediately consecutive or separated by data blocks.

In this text, a "basic block" is a group of successive instructions of the instruction flow which begins at a branch address and which ends with a single explicit or implicit branch instruction. An explicit branch instruction is characterized by the explicit presence of an opcode in the machine code which codes the branch instruction. An implicit branch instruction corresponds to the case where the execution of a preceding basic block continues systematically with the execution of a next basic block situated, in the machine code, immediately after the preceding basic block. In this case, given that, in the absence of explicit branch instruction, the instructions of the machine code are executed in order one after the other, it is not necessary to introduce, at the end of the preceding basic block, an explicit branch instruction to the next basic block. In this description, it is said that, in this case, the preceding basic block ends with an implicit branch instruction because it is not explicitly coded in the machine code. In this case, the preceding basic block ends just before the branch address of the next basic block. In this application, the expression "branch instruction" denotes an explicit branch instruction unless stated otherwise. Thus, the execution of a basic block begins systematically with the execution of the instruction situated at its branch address and ends systematically with the execution of the branch instruction which ends this basic block. A basic block does not include branch instructions other than that situated at the end of this basic block. Thus, the instructions of a basic block are systematically all read by the microprocessor one after the other in the order in which they are present in this basic block. The branch instruction can direct, when it is executed, the control flow systematically to the same branch address or, alternately, to different branch addresses. The latter case is encountered, for example, when, at the end of the executed basic block, the control flow can be continued to a first and, alternately, to a second basic block.

A "branch instruction" is an instruction which, when it is executed by the microprocessor, triggers a jump to the branch address of another basic block. This branch instruction therefore comprises at least as a parameter the branch address of this other basic block. Typically, to this end, this instruction replaces the current value of the ordinal counter with the value of the branch address. It is recalled that the ordinal counter contains the address of the next instruction to be executed by the microprocessor. In the absence of branch instruction, each time an instruction is executed, the ordinal counter is incremented by the size of the instruction currently executed. In the absence of branch instruction, the instructions are systematically executed sequentially one after the other in the order in which they are stored in a main memory. The branch instruction can be unconditional, that is to say that the jump to the branch address is systematically performed as soon as this instruction is executed. An unconditional branch instruction is, for example, the instruction "JMP" in assembly language for the microprocessors of the x86 series. The branch instruction can also be conditional, that is to say that the jump to the branch address is triggered upon its execution only if a particular condition is satisfied. For example, a conditional branch instruction is a "JE", "JA" or "JNE" instruction in assembly language. The branch instruction can also indeed be a call to a function. In this text, the term "branch instruction" denotes both direct and indirect branch instructions. A direct branch instruction is a branch instruction which directly contains the numeric value of the branch address. An indirect branch instruction is a branch instruction to a branch address contained in a memory or a register of the microprocessor. Thus, contrary to a direct branch instruction, an indirect branch instruction does not directly contain the numeric value of the branch address.

A "branch address" is the address in the main memory where the first instruction executed of a basic block is located. Consequently, the term branch address is used even for the basic blocks of which the first instruction is executed following the execution of an implicit branch instruction.

The expression execution of a function denotes the execution of the instructions performing this function.

For simplification, in this description and in the figures, the instructions are not represented in binary form, but rather in a symbolic form expressed in an advanced, higher level language.

Description of an Embodiment

Figure 1:
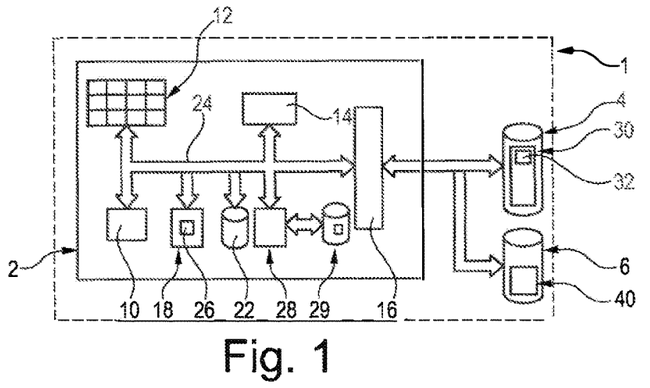
FIG. 1 is a schematic illustration of the architecture of an electronic device capable of executing a machine code of a secure function.

FIG. 1 represents an electronic device 1 comprising a microprocessor 2, a main memory 4 and a mass storage medium 6. For example, the device 1 is a computer, a smartphone, an electronic tablet, a chip card or the like.

The microprocessor 2 here comprises:
an arithmetic and logic unit 10;
a set 12 of registers;
a command module 14;
a data input/output interface 16;
a loader 18 of instructions comprising an ordinal counter 26;
a queue 22 of instructions to be executed, and
a hardware securing module 28.

The memory 4 is configured to store instructions of a binary code 30 of a program that has to be executed by the microprocessor 2. The memory 4 is a random access memory. Typically, the memory 4 is a volatile memory. The memory 4 can be a memory external to the microprocessor 2 as represented in FIG. 1. In this case, the memory 4 is, for example, produced on a substrate that is mechanically separate from the substrate on which the different elements of the microprocessor 2 like the unit 10 are produced.

In this exemplary embodiment, the binary code 30 notably comprises the machine code 32 of a secure function.

As an illustration, the microprocessor 2 conforms to the ARM ("Advanced Risk Machine") version 7 architecture and supports the instruction sets like Thumb1 and/or Thumb2.

The loader 18 loads into the queue 22 the next instruction to be executed by the unit 10 from the memory 4. More specifically, the loader 18 loads the instruction to which the ordinal counter 26 points. The loader 18 loads into the queue 22, systematically and each time, a complete word of N bits, where N is a constant integer generally greater than or equal to 8, 16, 32 or 64. N is therefore the loading size used by the microprocessor 2. For example, here, N is equal to 32.

The unit 10 is notably configured to execute the instructions loaded into the queue 22 one after the other. The instructions loaded into the queue 22 are generally systematically executed in the order in which these instructions have been stored in this queue 22. The unit 10 is also capable of storing the result of these instructions when executed in one or more of the registers of the set 12.

In this description, "execution by the microprocessor 2" and "execution by the unit 10" will be used as synonyms.

The module 14 is configured to move data between the set 12 of registers and the interface 16. The interface 16 is notably capable of acquiring data and instructions, for example from the memory 4 and/or the support 6 that are external to the microprocessor 2.

The module 28 is capable of automatically executing the following operations in place of the arithmetic and logic unit 10:

1) in response to the loading, by the loader 18, of an instruction to be protected of the basic block currently being executed, the module 28 constructs a value $C_k$ of a signature of this basic block, 2) in response to the loading, by the loader 18, of a branch instruction:

the module 28 compares the constructed value $C_k$ to an expected value $\Gamma_k$ for the signature of this basic block and only if these values are not identical, triggers the signaling of an execution fault, and the module 28 initializes the construction of a value $C_{k+1}$ of a signature of the next basic block.

To perform the operation 1) above, the module 28 implements and executes a preprogrammed function $F_{cs}(i_t, C_k)$ and, to perform the operation 2) above, the module 28 implements and executes a preprogrammed function $F_{vs}(v, IV_k)$. These functions are secret functions. To this end, there is no machine code for executing these functions in a memory situated outside of the microprocessor 2. Typically, they are implemented in hardware form inside the module 28 or their code is stored in a secure non-volatile memory 29 inside the microprocessor 2.

In this embodiment, the module 28 constructs the value of the signature of a basic block as and when the instructions to be protected of this basic block are loaded into the queue 22. More specifically, each time an instruction $i_t$ to be protected of the basic block is loaded into the queue 22, the module 28 constructs the new value $C_k$ of the signature of the basic block by executing the following operation: $C_k:=F_{cs}(i_i, C_k)$, in which the values $C_k$ on the left and on the right of the equals sign are, respectively, the new value and the old value of the signature of the basic block. Since the value $C_k$ is constructed iteratively from its preceding value, it is necessary to initialize the first value $C_k$ to be used. This first value is consequently called "initialization vector" is denoted $IV_k$.

For example, here, the function $F_{cs}(i_i, C_k)$ is the following function $F_{k1}(|i_i|$ XOR $C_k)$, in which:

$|i_i|$ is the numeric value of the instruction $i_i$ loaded,

XOR is the "exclusive OR" operation, $C_k$ is the current value of the signature currently being constructed, $F_{k1}(\ )$ is a symmetrical encryption function of the number contained between parentheses with a secret key k1.

The numeric value $|i_i|$ is obtained, for example, using the following relationship: $|i_i|=F_{vi}(i_i)$, in which $F_{vi}$ is a bijective function which, from the series of "0" and "1" which codes the instruction $i_i$, returns a numeric value. In this embodiment, to simplify, the function $F_{vi}(\ )$ is the identity function.

The key is stored in the secure memory 29 of the microprocessor 2. Here, it is a memory which can be read and/or written only by the module 28. There is no provision for access to this memory 29 without involving the module 28.

The function $F_{vs}(v, IV_k)$ is a function which returns, when it is executed by the module 28, an expected value $\Gamma_{k-1}$ for the signature of a preceding basic block $BB_{k-1}$, from the value of a parameter v and from an initialization vector $IV_k$ present at the start of a next basic block $BB_k$. The function $F_{vs}(v, IV_k)$ is such that, knowing the value $\Gamma_{k-1}$ expected for the signature of the block $BB_{k-1}$ and the initialization vector $IV_k$, it is possible to determine the value of the parameter v which satisfies the following relationship: $\Gamma_{k-1}=F_{vs}(v, IV_k)$. By way of illustration, here, the function $F_{vs}(v, IV_k)$ is the following function $F_{k1}(v$ XOR $IV_k)$, in which the symbols used have already been defined above. Thus, in this example, the functions $F_{cs}(i_i, C_k)$ and $F_{vs}(v, IV_k)$ are the same and only their arguments change. In this particular case, the value of the parameter v which makes it possible to satisfy the relationship: $\Gamma_{k-1}=F_{vs}(v, IV_k)$ is given by the following relationship: $v:=F_{k1}^{-1}(\Gamma_{k-1})$ XOR $IV_k$, in which $F_{k1}^{-1}(\ )$ is the inverse function of the function $F_{k1}(\ )$ that is to say, here, the decryption function.

In this exemplary embodiment, the set 12 comprises general registers that can be used to store any type of data and dedicated registers. Contrary to the general registers, the dedicated registers are dedicated to the storage of particular data that are generally automatically generated by the microprocessor 2.

The microprocessor 2 here comprises a data interchange bus 24 which links the different components of the microprocessor 2 to one another.

The medium 6 is typically a non-volatile memory. For example, it is a memory of EEPROM or Flash type. Here it contains a backup copy 40 of the binary code 30. Typically, it is this copy 40 which is automatically copied into the memory 4 to restore the code 30, for example, after a current outage or the like or just before the execution of the code 30 begins.

The machine code 32 is composed of a succession of basic blocks which must be executed one after the other.

Figure 2:
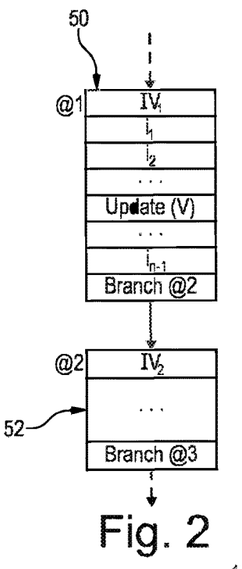
FIGS. 2 and 3 are schematic illustrations of different portions of a machine code of a secure function likely to be executed by the device of FIG. 1.

FIG. 2 represents a first arrangement of two basic blocks 50 and 52 of the machine code 32. In this first arrangement, the basic blocks 50 and 52 are systematically executed one after the other. In the order of execution, the basic block 50 precedes the basic block 52. In this figure and the subsequent figures:

the order of execution of the basic blocks is represented by an arrow which points from the preceding basic block to the next basic block, a dotted arrow which points to a basic block represented indicates that the basic block or blocks which precede this basic block have not been represented to simplify the figure, a dotted arrow which points to nothing from a basic block represented indicates that the basic block or blocks following this represented basic block have not been represented to simplify the figure.

Each basic block begins with a branch address and ends with a branch instruction. In FIG. 2, the symbols "@1" and "@2" alongside the first instruction of each basic block denote the branch addresses, respectively, of the basic blocks 50 and 52. The symbol "@3" denotes the branch address of another basic block not represented in FIG. 2.

The "Branch" instruction followed by a branch address such as @2 or @3 is an unconditional branch instruction to this branch address.

The first instructions "$IV_1$" and "$IV_2$", respectively, of the blocks 50 and 52, are the initialization vectors used to initialize the construction of the values $C_1$ and $C_2$ of the signatures, respectively, of the blocks 50 and 52 using the function $F_{CS}(i_i, C_k)$. These initialization vectors are coded on N bits, that is to say on the same number of bits as an instruction. However, contrary to an instruction, they can have any value. In particular, their value does not have to correspond to that of an instruction of the instruction set of the microprocessor 2. These initialization vectors are constants chosen in the generation of the machine code 32. A constant value is a value which cannot be modified in the execution of the machine code 32 except accidentally, such as, for example, in the case of fault injection.

In the figures and in the description, the symbol $IV_k$ is used to generally denote the initialization vector of a basic block $BB_k$, in which the index k is a serial number which unambiguously identifies this basic block among the set of the basic blocks of the function 32. Furthermore, in the simple cases like that represented in FIG. 2 in which two basic blocks follow one another in the order of execution of the function 32, the index k is also used to indicate the order in which these basic blocks are executed. For example, the notation $BB_{k-1}$ is, in these simple cases, used to denote the basic block which is systematically executed immediately before the basic block $BB_k$.

Here, the initialization vector of each basic block is chosen so that the expected value of the signature of this basic block is unique for each basic block of the machine code 32. "Unique for each basic block" denotes the fact that the probability of two basic blocks of the machine code 32 having the same expected value for their respective signature is less than 1 chance in 100 or in 1000. In practice, the probability of two basic blocks having the same expected value is generally much smaller. For example, preferably, this probability is less than $N_{va}/2^{c-1}$ or $N_{va}/2^c$, in which $N_{va}$ is the number of expected values used in the machine code, "c" is the number of bits used to code the maximum value of the initialization vectors in binary. In particular, the expression "unique for each basic block" therefore covers the case where the expected values of the signatures of all the basic blocks are systematically different from one another. Here, "c" is equal to N. For example, in a simple embodiment, upon the generation of the code 32, the initialization vectors of each basic block are drawn randomly or pseudo-randomly from the set $\{1; \ldots; 2^N\}$.

In this embodiment, each basic block comprises a specific instruction designated in the figures and in this text by the symbol "Update(v)". To simplify the figures, this specific instruction is only represented in FIG. 2 in the case of the block 50. The instruction "Update(v)" is an instruction of the instruction set of the microprocessor 2. When it is executed by the microprocessor 2, it provokes the replacement of the current value of the parameter v with a new value. Preferably, the value of the parameter v is stored in the memory 29. Here, the new value is directly contained in the machine code inside the basic block. Like the initialization vector, this new value is a constant chosen in the generation of the machine code. More specifically, in the generation of the code 32, the value of the parameter v is chosen to satisfy the following relationship: $\Gamma_{k-1} = F_{vs}(v, IV_k)$.

Each basic block comprises at least one instruction to be protected. In FIG. 2 and in this text, each instruction to be protected is denoted by the symbol $i_j$, in which the index i denotes the serial number of the instruction to be protected inside the basic block. The instruction $i_j$ can be any valid instruction of the instruction set of the microprocessor 2.

In this embodiment, all the instructions of all the basic blocks of the machine code 32 are considered to be instructions to be protected. To simplify the figures, the presence of these other instructions to be protected in each basic block is represented by the symbol " . . . ". In particular, in this embodiment, the "Update(v)" instruction and the branch instruction situated at the end of the basic block are also instructions to be protected.

Figure 3:
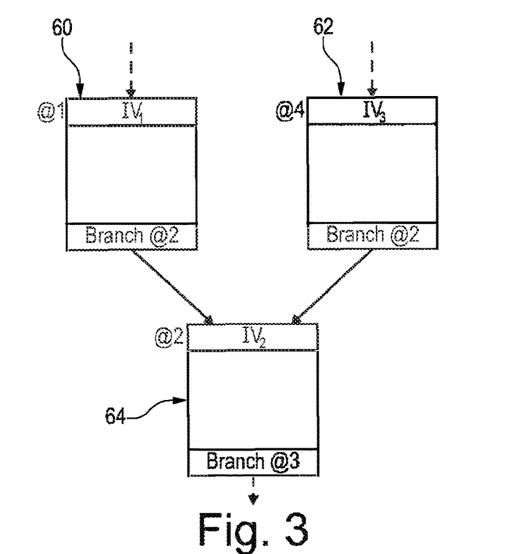

FIG. 3 represents another possible arrangement of several basic blocks of the code 32. This arrangement is used to show the benefit of the parameter v. This is illustrated here in the particular case of two preceding basic blocks 60 and 62 and one next basic block 64. Here, the blocks 60 and 64 are, for example, identical, respectively, to the blocks 50 and 52. The block 62 is constructed as described in more detail for the block 50 but the expected value $\Gamma_{62}$ of its signature is different from the expected value $\Gamma_{60}$ for the signature of the block 60. In the case of such an arrangement and if the parameter v was not used, then it would be necessary for the expected values $\Gamma_{60}$ and $\Gamma_{62}$ to satisfy the following relationship: $\Gamma_{60} = \Gamma_{62} = F_{vs}(IV_2)$, in which $IV_2$ is the initialization vector of the block 64. Such equality between the expected values $\Gamma_{60}$ and $\Gamma_{62}$ can generally be obtained only by appropriately choosing the initialization vectors $IV_1$ and $IV_3$. Through the use of the parameter v whose value is updated upon the execution of the blocks 60 and 62, the expected values $\Gamma_{60}$ and $\Gamma_{62}$ can be different while remaining capable of constructing the correct expected value from the same initialization vector $IV_2$. Thus, the use of the parameter v relaxes the constraints imposed on the choice of the initialization vectors $IV_B$ and $IV_3$. That therefore simplifies the generation of the code 32.

Figure 4:
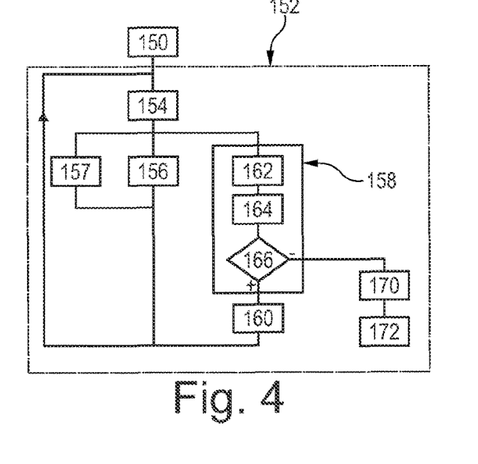
FIG. 4 is a flow diagram of a method for executing the machine code of a secure function.

FIG. 4 represents a method for execution of the binary code 30 by the microprocessor 2.

The method begins with a step 150 of supply of the binary code 30 in the memory 4. For that, for example, the microprocessor 2 copies the copy 40 inside the memory 4 to obtain the binary code 30 stored in the memory 4.

Then, in a phase 152, the microprocessor 2 executes the binary code 30 and, in particular, the machine code 32.

For that, in a step 154, the loader 18 loads the instructions to be executed one after the other into the queue 22.

Then, if the loaded instruction does not immediately follow a branch instruction, then, in a step 156, this instruction is decoded then the unit 10 executes it. Consequently, when an "Update(v)" instruction is loaded, the latter is executed and the current value of the parameter V in the memory 29 is replaced with a new value.

In parallel to the step 156, in a step 157, each time an instruction to be protected is loaded into the queue 22, the module 28 constructs the new value $C_k$ of the signature of the basic block currently being executed. For that, it implements the relationship $C_k := C_{cs}(i_j, C_k)$, that is to say, in the particular case described here, the relationship $C_k := F_{k1}(|i_j|$ XOR $C_k)$, in which the different symbols have been defined previously. Thus, the value $C_k$ of the signature of the block $BB_k$ is constructed as and when the instructions of this basic block are executed by the microprocessor 2. Typically, the step 157 is executed before the loaded instruction is executed by the unit 10. For example, it is executed before the loaded instruction is decoded.

When the loaded instruction is the branch instruction which delimits the end of the preceding basic block, then in response:

in a step 158, the module 28 verifies the integrity of the preceding basic block, then, in a step 160, the module 28 initializes the construction of the signature of the next basic block.

Subsequently, the preceding basic block and the next basic block are respectively denoted $BB_{k-1}$ and $BB_k$.

The step 158 begins with an operation 162 in which the microprocessor 2 loads the initialization vector $IV_k$ which is located at the branch address of the block $BB_k$ as if it were an instruction to be executed by the unit 10. However, after the execution of a branch instruction, the loaded instruction is transmitted to the module 28 and not to the unit 10.

In response, in an operation 164, the module 28 calculates the expected value $\Gamma_{k-1}$ using the following relationship: $\Gamma_{k-1} := F_{vs}(v, IV_k)$, that is to say, here, using the relationship $\Gamma_{k-1} := F_{k1}(v \text{ XOR } IV_k)$, in which "v" is the current value of the parameter v loaded upon the execution of the "Update (v)" instruction contained in the block $BB_{k-1}$.

Next, in an operation 166, the module 28 compares the constructed value $C_{k-1}$ of the signature of the block $BB_{k-1}$ to the expected value $\Gamma_{k-1}$ calculated for this same block. If these values correspond, that is to say, here, if they are identical, then the integrity of the block $BB_{k-1}$ is confirmed. Furthermore, given that, to calculate the expected value $\Gamma_{k-1}$, the value of the vector $IV_k$ contained in the block $BB_k$ is used, the value $\Gamma_{k-1}$ calculated can correspond to the value $C_{k-1}$ only if the integrity of the control flow has not been altered. Consequently, in the operation 166, the module verifies, at the same time and in a single comparison operation, the integrity of the control flow and the integrity of the block $BB_{k-1}$.

If the integrity of the block $BB_{k-1}$ and the integrity of the control flow are confirmed, the step 158 is completed and the method continues with the execution of the step 160. Otherwise, the method continues with a step 170 of signaling, by the microprocessor 2, of an execution fault.

In the step 160, the module 28 initializes the construction of the value $C_k$ of the signature of the block $BB_k$ with the vector $IV_k$. In other words, here, the module 28 performs the following operation: $C_k := IV_k$.

Upon the execution of the machine code 32, if attacks cause an instruction to be protected to be altered or the control flow to be modified, the microprocessor 2 signals, in the step 170, a fault in the execution of the machine code 32. In response to such signaling, in a step 172, for example, the microprocessor 2 implements one or more counter-measures. Very many counter-measures are possible. The counter-measures implemented can have very different degrees of severity. For example, the counter-measures implemented can range from a simple display of an error message without interrupting the normal execution of the machine code 32 to definitively taking the microprocessor 2 out of service. The microprocessor 2 is considered to be out of service when it is definitively placed in a state in which it is incapable of executing any machine code. Between these extreme degrees of severity, there are many other possible counter-measures such as:

the indication via a human-machine interface of the detection of the faults, the immediate interruption of the execution of the machine code 32 and/or the reinitialization thereof, and the deletion of the machine code 32 from the memory 4 and/or the deletion of the backup copy 40 and/or the deletion of the secret data.

Figure 5:
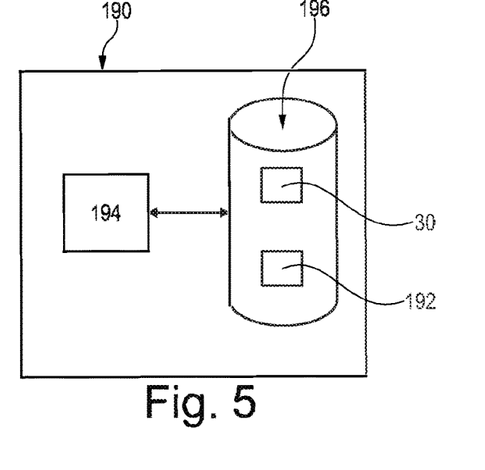
FIG. 5 is a schematic illustration of a compiler capable of generating the machine code executed by the device of FIG. 1.

FIG. 5 represents a compiler 190 capable of automatically generating the machine code 32 from a source code 192. To this end, the compiler 190 typically comprises a programmable microprocessor 194 and a memory 196. The memory 196 contains the instructions and the data necessary for, when they are executed by the microprocessor 194, automatically generating the machine code 32 from a source code 192. In particular, upon the compilation of the source code 192, the microprocessor 194 automatically introduces the "Update(v)" instructions and the appropriate initialization vectors $IV_k$ in the machine code 32. The design and the production of such a compiler are within the scope of the person skilled in the art based on the explanations given in this description.

Variants of the Binary Code

It is possible to guarantee the uniqueness of the expected value $\Gamma_k$ for each basic block by means other than a simple random draw. For example, upon the generation of the machine code, the expected value of the signature of each basic block is established as a function of the expected values already used for other basic blocks. For that, by way of illustration, upon the generation of the machine code, the following operations are executed in order:

a) The expected value for the basic block currently processed is first of all constructed by randomly drawing the initialization vector.

b) The expected value of the signature of the basic block currently processed is calculated then compared to the expected values constructed and stored for the basic blocks already processed.

c) If the expected value of the basic block currently processed is equal to one of the expected values already constructed and stored, the operations a) to c) are reiterated. Otherwise, the expected value constructed for this basic block currently processed is stored.

The reiteration of the operations a) to c) leads to a new initialization vector being drawn randomly for the basic block processed. Rather than randomly drawing a new initialization vector, it is also possible to modify the value of the parameter v or to modify certain instructions of this basic block without modifying the operation thereof. For example, it is possible to change the registers used, or to introduce an instruction which does nothing when it is executed, or to re-express a sequence of instructions as a new sequence of instructions that is different but semantically equivalent, that is to say that produces the same result.

In a simplified variant, the initialization vector has the same value and has that same value no matter where it is situated. It is then sufficient for the basic blocks not always to comprise the same instructions to be protected for the expected values of the signatures of different basic blocks to be different. Consequently, that always makes it possible to detect a large number of execution faults.

Variants of the Device:

The memory 4 can also be a non-volatile memory. In this case, it is not necessary to copy the binary code 30 in this memory before launching the execution thereof since it is already located therein.

As a variant, the memory 4 can also be an internal memory incorporated inside the microprocessor 2. In the latter case, it is produced on the same substrate as the other elements of the microprocessor 2. Finally, in other configurations, the memory 4 is composed of several memories, some of which are internal memories and others are external memories.

Signature Construction Variants:

As a variant, only certain instructions of each basic block are instructions to be protected. In this case, the value $C_k$ of the signature is constructed without taking into account all the values of all the instructions of the basic block but only some of these instructions. Thus, according to a first alternative, the value $C_k$ is constructed by taking into account only the instructions for which the serial number, in the basic block $BB_k$, is even.

According to a second alternative, only the instructions of the basic block $BB_k$ for which the opcode comprises a bit or a group of bits having a specific value are used to construct the value $C_k$ of the signature of this block. The other instructions of this block, for which the bit or the group of bits of the opcode has a different value from this specific value, are not taken into account for the construction of the value $C_k$. For example, the instruction set of the microprocessor is modified to add to it an additional bit which, when it takes the value "1", indicates that this instruction is an instruction to be protected which must be taken into account for the construction of the value $C_k$. Conversely, if this additional bit takes the value "0", this instruction is not an instruction to be protected and must not be taken into account for the construction of the value $C_k$ of the signature.

According to a third alternative, a specific instruction is added to the instruction set of the microprocessor 2. When this specific instruction is executed by this microprocessor, it indicates to the microprocessor that the M next instructions of the basic block are not instructions to be protected and must not therefore be taken into account for the construction of the values $C_k$ of the signature. Typically, M is an integer number greater than or equal to 1.

According to a fourth alternative, it is a specific bit of a status or control register of the microprocessor which indicates whether the loaded instruction is or is not an instruction to be protected. More specifically, when this specific bit takes a predetermined value, the loaded instruction is taken into account for the construction of the value $C_k$ of the signature. If this specific bit takes a different value from this predetermined value, then the loaded instruction is not taken into account for the construction of the value $C_k$ of the signature.

Other functions $F_{cs}( )$ can be used. In particular, the function $F_{cs}( )$ is not necessarily an encryption function implementing a secret key k1. Thus, in another embodiment, the function $F_{cs}( )$ is a simple logic or modular operation between the values $|i_i|$ and $C_k$. For example, in a particularly simple embodiment, the function $F_{cs}( )$ is a simple "exclusive OR" operation. The value $C_k$ is then constructed by using the following relationship: $C_k:=|i_i|$ XOR $C_k$.

In another advantageous exemplary embodiment, the function $F_{CS}( )$ is a homomorphism between two algebraic sets A and B. The set A is provided with an operation denoted "+" and the set B is provided with an operation denoted "*". This homomorphism is such that $F_{cs}(x+y)=F_{cs}(x)*F_{cs}(y)$, in which x and y are numbers belonging to the set A. Furthermore, this homomorphic function $F_{cs}$ is injective and the operations "+" and "*" are commutative and reversible operations. When the function $F_{cs}( )$ is a homomorphism, the value $C_{k-1}$ of the signature is for example constructed as follows:

$$C_{0,k-1} := F_{CS}(IV_{k-1}),$$

$$C_{1,k-1} := F_{CS}(|i_0|)*C_{0,k-1},$$

$$C_{2,k-1} := F_{CS}(|i_1|)*C_{1,k-1},$$

...

$$C_{n,k-1} := F_{CS}(|i_n|)*C_{n,k-1},$$

in which:

$C_{j,k-1}$ denotes the value $C_{k-1}$ during the jth iteration of the operation of construction of the value $C_{k-1}$, $C_{k-1}$ is equal to $C_{n,k-1}$.

Because of the fact that the function $F_{cs}( )$ is a homomorphism, the value $C_{k-1}$ constructed can also be written in the following form: $C_{k-1} := F_{cs}(IV_{k-1}+|i_0|+|i_1|+ \ldots +|i_n|)$. Moreover, the function $F_{vs}( )$ is identical to the function $F_{cs}( )$ and the calculation of the value $\Gamma_{k-1}$ is performed using the following relationship: $\Gamma_{k-1}=F_{cs}(v+IV_k)$. Consequently, the value of the parameter v can be calculated as follows: $v: = IV_{k-1}+|i_0|+|i_1|+ \ldots +|i_n|-IV_k$, in which the "−" symbol denotes the inverse of the "+" operation. Consequently, the value of the parameter v can be determined without it being necessary to invert the function $F_{cs}( )$ Similarly, if the value of the parameter v is imposed, the initialization vector is determined using the following relationship: $IV_k: =IV_{k-1}+|i_0|+|i_n|+ \ldots +-v$. In other words, when the function $F_{cs}( )$ is a homomorphism, the function $F_{cs}( )$ does not need to be reversible. Furthermore, the same function $F_{cs}( )$ is used to construct the value $C_{k-1}$ and to calculate the expected value $\Gamma_{k-1}$. What has been explained here is valid for any "+" and "*" operations and is not limited, for example, to the addition and multiplication operations. In particular, this embodiment makes it possible to use, as function $F_{cs}( )$ non-reversible functions such as certain hash functions or certain asymmetrical encryption functions for which only the public key or only the private key is known. By way of illustration, the following functions are homomorphisms which are suitable for producing the function $F_{cs}( )$:

the exponential function "e" because $e^{x+y}=e^x*e^y$, in which "+" and "*" are, respectively, the addition and multiplication operations, the logarithm function "log" because $\log(x*y)=\log(x)+\log(y)$, in which "+" and "*" are, respectively, the addition and multiplication operations, the Pallier encryption function "E" because $E(x)*E(y)=E(x+y \bmod(N))$ in which "+" and "*" are, respectively the modular (modulo N) addition and multiplication operations, the encryption function "E" known as "unpadded RSA" with a public key k expressed with a modulo m is a exponentiation "e" such that $e(x)=x^e \bmod m$, because $E(x)*E(y)=E(x*y)$, in which "*" is the multiplication operation, the Goldwasser-Micali encryption function "E" because $E(x)*E(y)=E(x \text{ XOR } y)$, in which "XOR" and "*" are, respectively, the "exclusive or" and multiplication operations, the homomorphic encryption functions.

In the case where the function $F_{cs}( )$ is a homomorphism, advantageously, the initialization vector $IV_{k-1}$ stored at the start of the block $BB_{k-1}$ is replaced with an initialization vector $F_{cs}(IV_{k-1})$, that is to say with the value $C_{0,k-1}$. In this case, the construction of the value $C_{k-1}$ begins directly with the operation $C_{1,k-1}: =F_{cs}(|I_0|)*C_{0,k-1}$, and no longer with the operation $C_{0,k-1}: =F_{cs}(IV_{k-1})$. That therefore limits the number of operations to be performed to construct the value $C_{k-1}$. Furthermore, when the function $F_{cs}( )$ is an asymmetrical encryption function, that can be used to guarantee either the authenticity of the binary code executed or to guarantee the authenticity of the module 28. More specifically, a first possibility consists in using a public key kp to construct the value $C_k$. In this case, the value $C_k$ is constructed using the following relationship: $C_k: =F_{kp}(i_i, C_k)$, in which $F_{kp}( )$ is the asymmetrical encryption function parameterized with the public key kp. In this case, the initialization vector placed at the beginning of the block $BB_{k+1}$ is the value $C_{0,k+1}$, that is to say the value $F_{kp}(IV_{k+1})$. To calculate the expected value $\Gamma_k$, the module 28 decrypts the value $C_{0,k+1}$ using the decryption function $D_{ks}( )$ corresponding to the function $F_{kp}$. The function $D_{ks}( )$ is parameterized with a secret key ks known only to the module 28. The module 28 thus obtains the vector $IV_{k+1}$. Then, the module calculates the value $\Gamma_k$, for example as previously described, that is to say using the operation $\Gamma_k=F_{vs}(v, IV_{k+1})$. Consequently, the verification of the integrity of the machine code can be performed only by a module 28 provided with the key ks while the machine code can be generated by any compiler having access to the public key kp. Conversely, the value $C_k$ can be constructed using the following relationship: $C_k: = D_{ks}(i_i, C_k)$. In this case, the initialization vector placed at the beginning of the block $BB_{k+1}$ is the value $C_{0,k+1}$ equal to $D_{ks}(IV_{k+1})$. To calculate the expected value $\Gamma_k$, the module 28 encrypts with the public key kp the value $C_{0,k+1}$. It thus obtains the value of the vector $IV_{k+1}$. Then, the module 28 calculates the value $\Gamma_k$ using the operation $\Gamma_k=F_{vs}(v, IV_{k+1})$. Consequently, in the latter embodiment, the verification of the integrity of the machine code can be performed by any module 28 provided with the key kp while the machine code can be generated only by a compiler provided with the private key ks.

In another variant, the function $F_{vi}( )$ is a bijective function other than identity which, with each code of an instruction in machine language associates a respective numeric value. For example, choosing a function $F_{vi}( )$ other than identity can have a benefit when the instructions of the instruction set have different sizes. In this case, a function $F_{vi}( )$ other than identity is used to associate, with each instruction of this instruction set, a numeric value chosen from a set in which all the numeric values have the same size.

Variants of the Function $F_{vs}( )$:

As a variant, the function $F_{vs}( )$ is different from the function $F_{cs}( )$. For example, in a simplified variant, the function $F_{vs}( )$ is the identity function. In this case, the initialization vector $IV_k$ situated at the beginning of the block $BB_k$ is equal to the expected value $\Gamma_{k-1}$ of the block $BB_{k-1}$. Furthermore, when this initialization vector $IV_k$ is used to initialize the construction of the signature of the block $BB_k$, in the absence of execution fault, that amounts to initializing the construction of the value $C_k$ with the value $C_{k-1}$. Thus, the construction of the value of the signature is not re-initialized after the execution of a branch instruction.

In all the embodiments described here, the function $F_{vs}( )$ can be replaced with a function $F_{vs}( )$ which has only a single argument, namely the initialization vector $IV_k$. Then $\Gamma_{k-1}: =$ $F_{vs}(IV_k)$ applies. In this case, to relax the constraints on the choice of the initialization vectors $IV_k$, the value $C_{k-1}$ is constructed from the values of the instructions to be protected of the block $BB_{k-1}$ and from the parameter v. For example, the value $C_{k-1}$ is constructed as described previously except that the following additional operation is added: $C_{k-1}:=F_{cs}(C_{k-1}, v)$. The execution of this additional operation is for example triggered when the branch instruction of the block $BB_{k-1}$ is loaded by the microprocessor 2. In this embodiment, the function $F_{vs}(\ )$ can be the identity function.

The parameter v can be omitted. For example, such is the case if each basic block has at most a single predecessor and a single next basic block.

Another possibility for not using the parameter v while relaxing the constraints on the choice of the initialization vectors consists, in the operation 166, in comparing the value $C_{k-1}$ to the different possible expected values for the preceding basic blocks. For example, in the case of the arrangement of FIG. 3, after the execution of the branch instruction to the block 64, in the operation 166, the module 28 successively compares the value $C_{k-1}$ to the expected value $\Gamma_{60}$ of the signature of the block 60 then to the expected value $\Gamma_{62}$ of the signature of the block 62. If the constructed value $C_{k-1}$ does not correspond to either of the values $\Gamma_{60}$ and $\Gamma_{62}$, the step 170 is executed. If, on the contrary, the value $C_{k-1}$ is equal to one of the values $\Gamma_{60}$ and $\Gamma_{62}$, then the step 160 is executed. In the operation 164, the module 28 calculates the values $\Gamma_{60}$ and $\Gamma_{62}$ from, respectively, initialization vectors $IV_{21}$ and $IV_{22}$ both situated at the beginning of the block 64. For example, the initialization vector $IV_{21}$ is stored at the address @2 and the initialization vector $IV_{22}$ is stored at the immediately next address. In this case, the number $N_{iv}$ of lines devoted to the storage of the initialization vector or vectors at the beginning of each basic block is constant. Thus, the microprocessor can simply determine where the instructions to be executed begin in each of the basic blocks. Alternatively, the number $N_{iv}$ can also be an adjustable parameter of the operation of the microprocessor.

As a variant, the construction of the value $C_k$ is initialized not directly with the vector $IV_k$ but with a value $g(IV_k)$, in which g is a known predetermined function of the module 28 and different from the identity function. For example, the function g can be an "exclusive or" between the initialization vector $IV_k$ and a constant known only to the module 28 and stored in the memory 29.

Variants of the "Update(v)" Instruction

The "Update(v)" instruction can be replaced with an "Update(reg)" instruction, in which "reg" is the address of a register. When the microprocessor executes the "Update (reg)" instruction, it replaces the current value of the parameter v with the value contained in the register situated at the address "reg".

The "Update(v)" instruction can also be replaced by an Update(@$_{off}$) instruction in which @$_{off}$ is an offset value relative to a predetermined fixed address @$_{init}$. When the microprocessor 2 executes the "Update(@$_{off}$)" instruction, it replaces the current value of the parameter v with the value contained in a machine word situated at the address @$_{init}$+@$_{off}$.

The "Update(v)" instruction can also be replaced with two instructions, "Update(v$_{low}$)" and "Update(v$_{high}$)". When the microprocessor executes the "Update(v$_{low}$)" instruction, it replaces the low-order bits of the current value of the parameter v with the value v$_{low}$. When the microprocessor executes the "Update(v$_{high}$)" instruction, it replaces the high-order bits of the current value of the parameter v with the value v$_{high}$.

These different embodiments of the "Update(v)" instruction are in particular useful if the value of the parameter v is coded on the same number of bits as the instructions of the microprocessor. In this case, it is not possible to directly code the new value of the parameter v in this instruction.

In another variant, the value of the parameter v is not directly contained inside the basic block but deduced from a value v* contained in this basic block. For example, the value v* is a cryptogram of the value of the parameter v obtained by encrypting this value of the parameter v using an encryption function, for example symmetrical. In a simplified embodiment, the value v* is equal to $F_{k1}(V)$. In this case, when the "Update(v)" instruction is loaded, the value v* is transmitted to the module 28 which decrypts it using the key k1 and the function $F_{k1}^{-1}$ to obtain the new value of the parameter v. Next, this new value of the parameter v is stored in the memory 29 in place of the preceding one.

A preceding basic block can end with a conditional branch instruction to a first basic block if the condition is satisfied and, alternately, to a second basic block otherwise. In this case, the first and second next basic blocks can comprise, at their respective branch addresses, the same initialization vector. Thus, what has been described here applies with no additional modification to managing this type of arrangement of the basic blocks of the code 32. Alternatively, if it is desirable for the initialization vectors of the first and second next basic blocks to be different, then an "Update(v$_1$)" instruction and an "Update(v$_2$)" instruction are introduced into the preceding basic block. These instructions are then parameterized by a condition such that the "Update(v$_1$)" instruction is executed only if the next basic block is the first basic block and the "Update(v$_2$)" instruction is executed only if the next basic block is the second next basic block. The choice of the values v$_1$ and v$_2$ of the parameter v is then made as described previously so as to satisfy the condition $\Gamma_{k-1}=F_{vs}(v_1, IV_1)=F_{vs}(v_2, IV_2)$, in which $IV_1$ and $IV_2$ are the initialization vectors, respectively, of the first and second next blocks. This embodiment can be used with microprocessors capable of executing instructions conditionally, that is to say only if a parameterizable condition is satisfied. Otherwise, the microprocessor does not execute this instruction. Preferably, the condition tested is the same as that tested by the conditional branch instruction. Furthermore, by virtue of that, it is possible to trigger the signaling of an execution fault if the instruction flow is diverted to the first basic block while the condition is not satisfied.

There is yet another alternative to the embodiment of the preceding paragraph. For example, the set 12 can contain a dedicated register which contains a value which varies as a function of the condition of a conditional branch. More specifically, its value is not the same depending on whether this condition is satisfied or not. This dedicated register is often called "status register". In an ARM architecture, this dedicated register is known by the acronym CPSR ("Current Program Statut Register"). The CPSR contains notably the following bits:

the bit N which takes the value "1" if the result of the condition is negative and the value "0" otherwise, the bit Z which takes the value "1" if the result of the condition is nil and "0" otherwise, the bit C which takes the value "1" if the result of the condition has been retained and the value "0" otherwise, the bit V which takes the value "1" if the result of the condition has overflowed and the value "0" otherwise.

Here, the value of these four bits N, Z, C and V is collectively denoted by the "NZCV value". Depending on the condition to be satisfied, only a part of the bits of the NZCV value is useful and the values of the other bits must be disregarded. For that, the value of a mask M identifying the position of the useful bits is loaded into a register of the microprocessor 2 before the execution of the conditional branch instruction. The preceding basic block therefore to this end comprises an instruction to load this mask M. This mask M, like the expected NZCV value, is determined upon the generation of the machine code. Here, the mask M comprises four bits. One bit of the mask M takes the value "1" to indicate the position of a useful bit in the NZCV value. In this case, the value of the parameter v is calculated using the following relationship: v: =h($v_1$, c, M), in which:

$v_1$ is a value loaded by an "update($v_1$)" instruction contained in the preceding basic block, "c" is the NZCV value, "M" is the value of the mask M.

For example, the function h($v_1$, c, M) is as follows: h($v_1$, c, M)=$v_1$ XOR extend(c ∧ M), in which:

the symbol "∧" denotes the logic "AND" operation, and extend( . . . ) is a function which returns a number coded on N bits from the number c∧M coded on four bits.

In this embodiment, the value of the parameter v is not therefore the same if the condition of the conditional branch instruction is satisfied or not. Thus, depending on whether the execution of the machine code is continued with the execution of the first or the second basic block, the value of the parameter v is not the same.

Variants of the Triggering of the Integrity Check

It is not essential for the check on the integrity of the preceding basic block and of the control flow to be triggered systematically and immediately after the execution of a branch instruction. For example, as a variant, the verification of the integrity is not triggered by a branch instruction but by a specific instruction here called "Verify". When the microprocessor encounters the "Verify" instruction in the machine code, it then executes the following operations:

1) It reads the value of the instruction which immediately follows the "Verify" instruction. This read value is an initialization vector which was constructed in the generation of the machine code to verify, as described previously, the integrity of the basic block and the integrity of the control flow.

2) Next, the microprocessor compares the constructed value $C_k$ of the signature to the expected value $\Gamma_k$ calculated from the value of the parameter v and from the initialization vector $IV_{k+1}$ as described previously.

3) Next, the value $C_{k+1}$ of the signature is initialized using the vector $IV_{k+1}$ as described previously.

4) Finally, the ordinal counter is incremented to point to the instruction situated immediately after the vector $IV_{k+1}$.

Such a "Verify" instruction can be placed at any point inside the basic block $BB_{k+1}$ and not only at the beginning of this basic block. Consequently, the constructed value of the signature can be a function of the instructions to be protected present between this occurrence of the "Verify" instruction and the preceding "Verify" instruction executed. In this case, the value $C_k$ can depend both on instructions to be protected contained in the preceding basic block and on instructions to be protected also contained in the next basic block. Typically, the "Verify" instruction is an additional instruction added to the instruction set of the microprocessor 2.

In the same embodiment, it is also possible to trigger the integrity check both in response to the loading of a branch instruction and in response to the execution of a "Verify" instruction.

In another embodiment, it is a specific value of a bit or of a group of bits of the opcodes of the instruction set of the microprocessor 2 which triggers the verification of the integrity and the initialization of the calculation of the signature of the next basic block. For example, to this end, the instruction set of the microprocessor 2 is modified for each opcode to include an additional bit or a group of additional bits. Typically, if the microprocessor detects that the value of this additional bit in the loaded opcode is equal to "1", then it triggers the verification of the integrity and the initialization of the signature of the next basic block before executing this instruction. If, on the contrary, the value of the additional bit of the loaded opcode is equal to 0, the microprocessor 2 does not trigger these operations of verification of the integrity and of initialization of the signature of the next basic block.

In the embodiments in which the verification of the constructed value is triggered by a specific instruction, such as the "Verify" instruction, or by a specific value of a bit or of a group of bits of the opcodes, the branch instructions at the end of the basic blocks can be implicit branch instructions.

The initialization of the value $C_k$ of the next basic block and the integrity check have been described hitherto as being triggered by the same instruction of the machine code. However, the initialization of the value $C_k$ and the triggering of the integrity check can be triggered by different instructions of the machine code. In this case, these two operations are not then necessarily performed immediately one after the other. For example, the initialization of the signature of the next basic block can be triggered in response to the execution of a branch instruction and the verification of the integrity can be triggered only when a "Verify" instruction is encountered in the basic block currently being executed.

Other Variants:

In all the embodiments, the combinations of two values, such as the current value of the parameter v with the initialization vector $IV_k$, is not necessarily performed with an "exclusive or". For example, as a variant, the "exclusive or" is replaced with a modular arithmetic operation.

Here, the initialization vector $IV_k$ is first of all chosen then the value of the parameter v is determined so that, in the absence of execution fault, the values $C_k$ and $\Gamma_k$ correspond. However, all the embodiments described here can be adapted to do the reverse, that is to say first of all set the value of the parameter v, then calculate the initialization vector $IV_k$ so that, in the absence of execution fault, the values $C_k$ and $\Gamma_k$ correspond.

It is possible to automatically add additional unconditional branch instructions in the middle of a basic block to divide it into several successive basic blocks. That notably makes it possible to more frequently trigger the verification of the integrity of the machine code.

In another variant, the value $C_k$ is not initialized from the initialization vector $IV_k$ but from another initialization vector $IV_{kbis}$. The vector $IV_{kbis}$ is independent of the vector $IV_k$. Like the vector $IV_k$, the vector $IV_{kbis}$ is stored in the code of the basic block $BB_k$. For example, the vector $IV_{kbis}$ is systematically stored after the vector $IV_k$ and loaded into the memory 29 immediately after the loading of the vector $IV_k$. In this case, the operations of verification of the value $C_{k-1}$ and of initialization of the value $C_k$ are not systematically performed at the same time and by using the same initialization vector. For example, the initialization of the value $C_k$ can be triggered by a specific instruction in the middle of basic block $BB_k$ and not necessarily situated at the beginning of this basic block $BB_k$. The vector $IV_{kbis}$ is then preferably chosen to be unique for each basic block. For example, it is drawn randomly or pseudo-randomly upon the compilation of the machine code.

In another variant, the machine code, and in particular the basic blocks, are instrumented so that an execution error in a conditional branch can be detected. For that, the machine code is modified as described with reference to FIGS. 5 and 6 of the patent application filed by the present applicant on Apr. 11 2017 under the number FR1753175.

It is possible to add to the machine code instructions for activation and for deactivation of a secure mode when they are executed by the microprocessor. In the secure mode, the integrity of the basic blocks and of the control flow is verified as described here. When the secure mode is deactivated, the integrity of the basic blocks and of the control flow is not verified. Thus, portions of the machine code can be secured while other portions are not.

The different embodiments described here can be combined with one another.

Advantages of the Embodiments Described Here:

The module 28 compares the constructed value $C_{k-1}$ to the value $\Gamma_{k-1}$. The value $\Gamma_{k-1}$ is determined in the generation of the machine code 32. Thus, if an instruction to be protected of the block $BB_{k-1}$ is modified upon the execution of the machine code, the module 28 is capable of detecting and signaling this fault.

Furthermore, the expected value $\Gamma_{k-1}$ can only be calculated from an initialization vector $IV_k$ which is located in the next basic block $BB_k$. Consequently, if the control flow is modified upon the execution of the machine code 32 and the next basic block $BB_k$ is replaced with another, different basic block $BB_t$, the initialization vector $IV_t$ loaded from the block $BB_t$ is different from the initialization vector $IV_k$. Consequently, the expected value $\Gamma_t$ calculated for the signature of the block $BB_{k-1}$ from the value $IV_t$ is different from the value initially expected $\Gamma_{k-1}$. It is then very improbable that the value $C_{k-1}$ corresponds to the value $\Gamma_t$. Thus, the module 28 is also capable of detecting a modification of the control flow. To do that, it will be noted that they are the same data, that is to say the initialization vectors contained in the basic blocks, which are used to do these two verifications. Because of that, the methods described here are simpler than the known methods while remaining capable of verifying both the integrity of the machine code and the integrity of the control flow. In particular, the verification of the integrity of the control flow does not require additional modifications of the machine code in addition to those already necessary for verifying the integrity of the machine code. Nor does the verification of the integrity of the control flow require the execution by the additional processing module 28 which would not be useful if only the integrity of the machine code were verified.

The fact of using the same initialization vector both to calculate the value $\Gamma_{k-1}$ and to initialize the value $C_k$ reinforces the security of the method. Indeed, a hacker can try to modify the instructions to be protected of the block $BB_{k-1}$ and the initialization vector $IV_k$ contained in the block $BB_k$, so that the module 28 does not detect these modifications and does not signal an execution fault. However, by doing that, the attacker necessarily modifies also the constructed value $C_k$ of the signature of the block $BB_k$. Consequently, the module 28 will nevertheless signal a fault at the moment of verification of the integrity of the block $BB_k$.

The fact of using the value of the parameter v to calculate the expected value or the constructed value of the signature of the preceding basic block and of loading the value of this parameter in the execution of the preceding basic block makes it possible to have the method described here operate even in the case where there are several preceding basic blocks for one and the same next basic block. Furthermore, the use of the parameter v relaxes the constraints on the choice of the initialization vectors of the preceding basic blocks. That therefore simplifies the generation of the machine code.

The fact of calculating the expected value or the constructed value as a function of the condition of the conditional branch instruction which ends the preceding basic block makes it possible to trigger the signaling of an execution fault in the case of switching error in the instruction flow. For example, that makes it possible to trigger the signaling of an execution fault if the first basic block is executed while the condition is not satisfied.

The fact of using an encryption function to construct the expected value $\Gamma_{k-1}$ from the vector $IV_k$ increases the security because it is then very difficult to retrieve the expected value $\Gamma_{k-1}$ by knowing only the vector $IV_k$. For example, that renders the attacks in which the hacker tries to replace the block $BB_{k-1}$ with another basic block which would have the same signature more difficult. Indeed, in this case, the expected value $\Gamma_{k-1}$ is not easy to determine.

The fact of using a homomorphism to construct the value of the signature makes it possible to determine the value of the parameter v which will have to be used without it being necessary for this preprogrammed function to be reversible.

The fact of using asymmetrical encryption and decryption functions to perform the functions $F_{cs}()$ and $F_{vs}()$ makes it possible to also guarantee either the authenticity of the module 28 or the authenticity of the machine code.

The fact of choosing the function $F_{vs}()$ equal to the identity function simplifies the method.

The invention claimed is:

1. A method for executing a machine code of a secure function by a microprocessor, the method comprising:
   a) supplying the machine code, the machine code comprising a succession of basic blocks, wherein
      each basic block comprises a succession of instructions systematically executed one after another upon execution of the machine code by the microprocessor, at least some of the instructions to be protected, and
      each basic block begins at a branch address and ends with a branch instruction to a branch address of another basic block, the basic block which begins at the branch address being called "next basic block" and a basic block which ends with a branch instruction to the branch address being called "preceding basic block",
   b) upon the execution of the machine code by the microprocessor,
      1) loading and decoding, by the microprocessor, the instructions of the preceding and next basic blocks of the machine code, then executing each decoded instruction by an arithmetic and logic unit of the microprocessor,
      2) each time an instruction to be protected of the preceding basic block is loaded, constructing, by a hardware securing module of the microprocessor, using a preprogrammed function $F_{cs}(\ )$, a new value of a signature from a value of the instruction to be protected and from a preceding value of the signature, the signature being a function of values of different instructions to be protected of the preceding basic block, 3) loading, by the microprocessor, an initialization vector contained in the machine code and calculating, by the hardware securing module, from the loaded initialization vector and using a preprogrammed function $F_{cs}(\ )$, an expected value for a signature of the preceding basic block, 4) in response to loading of a predetermined instruction, comparing, by the hardware securing module, the constructed new value of the signature to the expected value of the signature calculated from the loaded initialization vector, and 5) only if the compared values do not correspond, triggering, by the hardware securing module, signaling of a fault upon the execution of the machine code and, otherwise, inhibiting the signaling, wherein the initialization vector is only contained in the next basic block.

2. The method as claimed in claim 1, wherein:

the next basic block is also a preceding basic block for another basic block of the machine code such that 1) to 5) are also performed for the next basic block, and upon execution of the next basic block, the hardware securing module initializes the constructed value of the signature of the next basic block from the same initialization vector as the initialization vector used to calculate the expected value of the signature of the preceding basic block, such that the constructed value of the signature of the next basic block depends also on the initialization vector.

3. The method as claimed in claim 1, wherein:

in 3), the hardware securing module calculates the expected value of the signature of the preceding basic block, in addition, from a loaded value of a parameter v such that the expected value of the signature of the preceding basic block varies as a function of the loaded value of the parameter v or, in 2), the hardware securing module constructs the new value of the signature of the preceding basic block, in addition, from the loaded value of a parameter v such that the constructed value of the signature of the preceding basic block varies as a function of the loaded value of the parameter v, and the preceding basic block comprises a predetermined instruction which, when the predetermined instruction is executed by the microprocessor, provokes the loading of the value of the parameter v, the value of the parameter v being contained in the preceding basic block and such that, in absence of modification of the instructions to be protected of the preceding basic block, the expected value calculated in 3) corresponds to the constructed value of the signature of the preceding basic block.

4. The method as claimed in claim 1, wherein:

a) comprises supply of a preceding basic block ending with a conditional branch instruction which, when a condition is satisfied, provokes, when the conditional branch instruction is executed by the microprocessor, a branch to a first next basic block and, alternately, when the condition is not satisfied, provokes, when the conditional branch instruction is executed by the microprocessor, a branch to a second next basic block different from the first next basic block, and in 3), the hardware securing module calculates the expected value of the signature of the preceding basic block, in addition, from a value contained in a register, the value contained in the register not being the same according to whether the condition is satisfied or not, such that the expected value of the signature of the preceding basic block varies as a function of the value contained in the register or, in 2), the hardware securing module constructs the new value of the signature of the preceding basic block, in addition, from the value contained in the register such that the constructed value of the signature of the preceding basic block varies as a function of the value contained in the register.

5. The method as claimed in claim 1, wherein, in 2), the preprogrammed function $F_{cs}(\ )$ is an encryption function using a secret key stored in a secure memory of the microprocessor, the secure memory being only accessible by internal components of the microprocessor.

6. The method as claimed in claim 1, wherein, in 2), the preprogrammed function $F_{cs}(\ )$ is an algebraic homomorphism.

7. The method as claimed in claim 6, wherein:

the preprogrammed functions $F_{cs}(\ )$ and $F_{vs}(\ )$ implement, respectively, an asymmetrical encryption function using a public key and a decryption function using a private key corresponds to the public key, or the preprogrammed functions $F_{cs}(\ )$ and $F_{vs}(\ )$ implement, respectively, an asymmetrical encryption function using a private key and an encryption function using a public key corresponds to the private key.

8. The method as claimed in claim 1, wherein the preprogrammed function $F_{vs}(\ )$ is an identity function.

9. A non-transitory computer-readable storage medium storing computer-readable machine code of a secure function, which, when executed by a microprocessor, causes the microprocessor to perform an execution method, the method comprising:

a) supplying the machine code, the machine code comprising a succession of basic blocks, wherein each basic block comprises a succession of instructions systematically executed one after another upon execution of the machine code by the microprocessor, at least some of the instructions to be protected, and each basic block begins at a branch address and ends with a branch instruction to a branch address of another basic block, the basic block which begins at the branch address being called "next basic block" and a basic block which ends with a branch instruction to the branch address being called "preceding basic block", b) upon the execution of the machine code by the microprocessor, 1) loading and decoding, by the microprocessor, the instructions of the preceding and next basic blocks of the machine code, then executing each decoded instruction by an arithmetic and logic unit of the microprocessor, 2) each time an instruction to be protected of the preceding basic block is loaded, constructing, by a hardware securing module of the microprocessor, using a preprogrammed function $F_{cs}(\ )$, a new value of a signature from a value of the instruction to be protected and from a preceding value of the signature, the signature being a function of values of different instructions to be protected of the preceding basic block, 3) loading, by the microprocessor, an initialization vector contained in the machine code and calculating, by the hardware securing module, from the loaded initialization vector and using a preprogrammed function $F_{Vs}(\ )$, an expected value for a signature of the preceding basic block, 4) in response to loading of a predetermined instruction, comparing, by the hardware securing module, the constructed new value of the signature to the expected value of the signature calculated from the loaded initialization vector, and 5) only if the compared values do not correspond, triggering, by the hardware securing module, signaling of a fault upon the execution of the machine code and, otherwise, inhibiting the signaling, wherein the initialization vector is only contained in the next basic block.

10. An electronic device, comprising:

a memory in which is stored a machine code of a secure function, the machine code comprising a succession of basic blocks, wherein each basic block comprises a succession of instructions systematically executed one after another upon execution of the machine code by a microprocessor, at least some of the instructions to be protected, and each basic block begins at a branch address and ends with a branch instruction to a branch address of another basic block, the basic block which begins at the branch address being called "next basic block" and a basic block which ends with a branch instruction to the branch address being called "preceding basic block"; and the microprocessor comprising an arithmetic and logic unit and a hardware securing module, the microprocessor being configured to execute the machine code stored in the memory, the microprocessor being configured, upon the execution of the machine code, to load and decode the instructions of the preceding and next basic blocks of the machine code, and the arithmetic and logic unit is configured to execute each decoded instruction, wherein the hardware securing module is configured, upon the execution of the machine code, to perform:

constructing, each time an instruction to be protected of the preceding basic block is loaded, using a preprogrammed function $F_{cs}(\ )$, a new value of a signature from a value of the instruction to be protected and from a preceding value of the signature, the signature being a function of values of different instructions to be protected of the preceding basic block, calculating, each time the microprocessor loads an initialization vector contained in the machine code, from the loaded initialization vector and using a preprogrammed function $F_{cs}(\ )$, an expected value for a signature of the preceding basic block, comparing, in response to loading of a predetermined instruction, the constructed new value of the signature to the expected value of the signature calculated from the loaded initialization vector, and triggering, only if the compared values do not correspond, the signaling of a fault upon the execution of the machine code and, otherwise, inhibits such signaling, wherein the initialization vector is only contained in the next basic block.

* * * * *

UNITED STATES PATENT AND TRADEMARK OFFICE
CERTIFICATE OF CORRECTION

PATENT NO. : 11,442,738 B2
APPLICATION NO. : 16/643906
DATED : September 13, 2022
INVENTOR(S) : Courousse Page 1 of 1

It is certified that error appears in the above-identified patent and that said Letters Patent is hereby corrected as shown below:

In the Claims

In Column 21, Claim 1, Line 11, delete "$F_{cs}(\ )$," and insert -- $F_{vs}(\ )$, --, therefor.

In Column 23, Claim 9, Line 5, delete "$F_{Vs}(\ )$," and insert -- $F_{vs}(\ )$, --, therefor.

In Column 24, Claim 10, Line 21, delete "$F_{cs}(\ )$," and insert -- $F_{vs}(\ )$, --, therefor.

Signed and Sealed this
Ninth Day of May, 2023

*Katherine Kelly Vidal*

Katherine Kelly Vidal
*Director of the United States Patent and Trademark Office*